United States Patent
Roller et al.

(10) Patent No.: US 9,587,167 B2
(45) Date of Patent: Mar. 7, 2017

(54) FOR STORAGE OF SURFACTANT CONCENTRATE SOLUTION

(71) Applicant: Chemical Flooding Technologies, LLC, Tulsa, OK (US)

(72) Inventors: Chad Barrett Roller, Tulsa, OK (US); Daniel Warren Phelps, League City, TX (US)

(73) Assignee: Chemical Flooding Technologies, LLC, Tulsa, OK (US)

( * ) Notice: Subject to any disclaimer, the term of this patent is extended or adjusted under 35 U.S.C. 154(b) by 0 days.

(21) Appl. No.: 14/518,834

(22) Filed: Oct. 20, 2014

(65) Prior Publication Data
US 2015/0108159 A1   Apr. 23, 2015

Related U.S. Application Data

(60) Provisional application No. 61/893,013, filed on Oct. 18, 2013.

(51) Int. Cl.

| | |
|---|---|
| *B65D 77/06* | (2006.01) |
| *C09K 8/58* | (2006.01) |
| *B65D 90/04* | (2006.01) |
| *C09K 8/584* | (2006.01) |

(52) U.S. Cl.
CPC ............... *C09K 8/58* (2013.01); *B65D 90/046* (2013.01); *B65D 2590/046* (2013.01); *C09K 8/584* (2013.01)

(58) Field of Classification Search
CPC ........ C09K 8/58; C09K 8/584; B65D 90/046; B65D 2590/046
See application file for complete search history.

(56) References Cited

U.S. PATENT DOCUMENTS

| | | | | |
|---|---|---|---|---|
| 3,889,224 | A * | 6/1975 | Reed | B63B 22/003 244/142 |
| 3,938,708 | A * | 2/1976 | Burger | B65D 83/62 222/192 |
| 5,376,182 | A * | 12/1994 | Everett | C10G 1/00 134/1 |
| 6,387,278 | B1 * | 5/2002 | Leif | B01F 17/0021 166/272.3 |
| 6,439,310 | B1 * | 8/2002 | Scott, III | E21B 43/26 166/250.1 |

(Continued)

*Primary Examiner* — Frederick C Nicolas

(57) ABSTRACT

To minimize headspace in a storage container and thereby reduce or eliminate alcohol evaporation, concentrated surfactant solutions stabilized by a diluent of higher volatility than the surfactant, such as alcohol, are stored in a flexible bladder fabricated from fabric including an impermeable or semipermeable membrane, such as polyurethane coated fabric. Because the bladder automatically deflates as the fluid level decreases, minimal head space is maintained and evaporation of the alcohol is thus constrained. A rigid support structure may be employed to hold the flexible bladder. With such a storage system, concentrated surfactant solutions may be manufactured at a convenient location for transport to and storage near an injection well, with considerable time between manufacture and application allowed before the surfactant solution degrades by an unacceptable amount.

20 Claims, 1 Drawing Sheet

(56) References Cited

U.S. PATENT DOCUMENTS

| | | | | |
|---|---|---|---|---|
| 7,472,747 B1* | 1/2009 | Brigmon | ............... | C09K 8/582 |
| | | | | 166/246 |
| 7,677,673 B2* | 3/2010 | Tranquilla | ............ | E21B 43/003 |
| | | | | 166/248 |
| 8,486,043 B2* | 7/2013 | Iyer | ......................... | A61J 1/067 |
| | | | | 128/200.24 |
| 8,807,383 B2* | 8/2014 | Weng | ...................... | B67D 7/78 |
| | | | | 220/216 |
| 2011/0194992 A1* | 8/2011 | Barton | ...................... | B01J 7/02 |
| | | | | 422/239 |

* cited by examiner

FOR STORAGE OF SURFACTANT CONCENTRATE SOLUTION

CROSS-REFERENCE TO RELATED APPLICATION(S) AND CLAIM OF PRIORITY

This application claims priority to and hereby incorporates by reference U.S. Provisional Patent Application No. 61/893,013, filed Oct. 18, 2013, entitled "DESIGN FOR STORAGE OF SURFACTANT CONCENTRATE SOLUTION."

TECHNICAL FIELD

The present disclosure relates generally to use of surfactant concentrates in enhanced oil recovery and, more specifically, to storage of surfactant concentrate solutions for transportation to and use at locations remote from the site of mixture.

BACKGROUND

To stabilize concentrated surfactant solutions utilized for enhanced oil recovery that include active surfactant content ranging from 35% to 90%, alcohols such as isopropyl alcohol (IPA) or isobutyl alcohol (IBA) are added to the concentrated solutions to stabilize them. It is preferable to blend these surfactant solutions at a convenient industrial facility rather than in the field, at a location proximate to the geographic region of use. In order to avoid having to blend the surfactant solution in the field, however, suitable storage during transportation and while awaiting use is necessary.

There is, therefore, a need in the art for improved surfactant solution storage.

SUMMARY

To minimize headspace in a storage container and thereby reduce or eliminate alcohol evaporation, concentrated surfactant solutions stabilized by alcohol are stored in a flexible bladder fabricated from polyurethane coated fabric. Because the bladder automatically deflates as the fluid level decreases, minimal head space is maintained and evaporation of the alcohol is thus constrained. A rigid support structure may be employed to hold the flexible bladder. With such a storage system, concentrated surfactant solutions may be manufactured at a convenient location for transport to and storage near an injection well, with considerable time between manufacture and application allowed before the surfactant solution degrades by an unacceptable amount.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
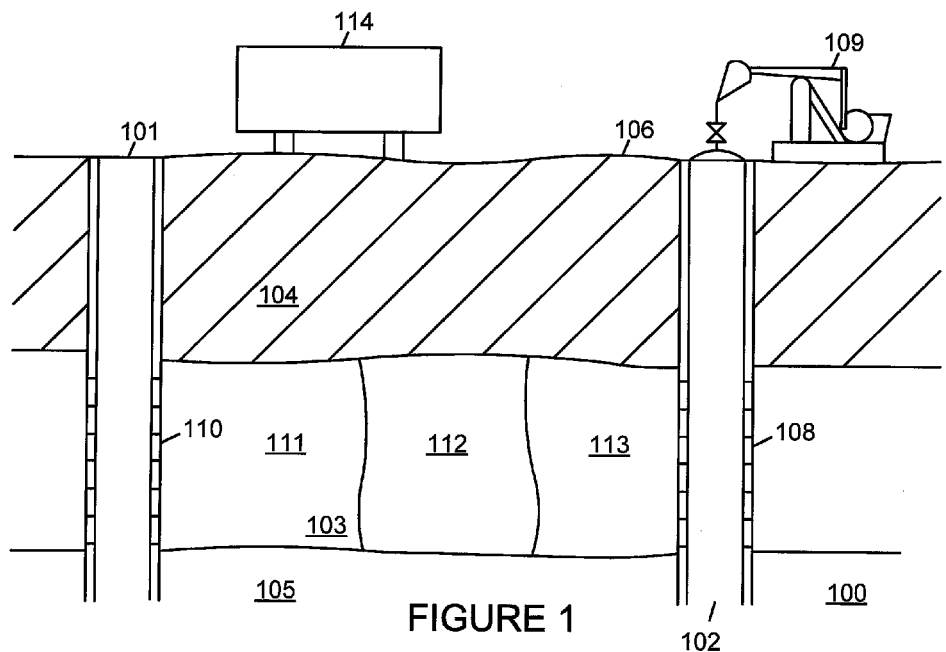
FIG. 1 is a simplified diagram of concentrated surfactant solution storage proximate to the geographic location of enhanced oil recovery from a subterranean formation in accordance with various embodiments of the present disclosure.
Figures 2A, 2B, 2C:
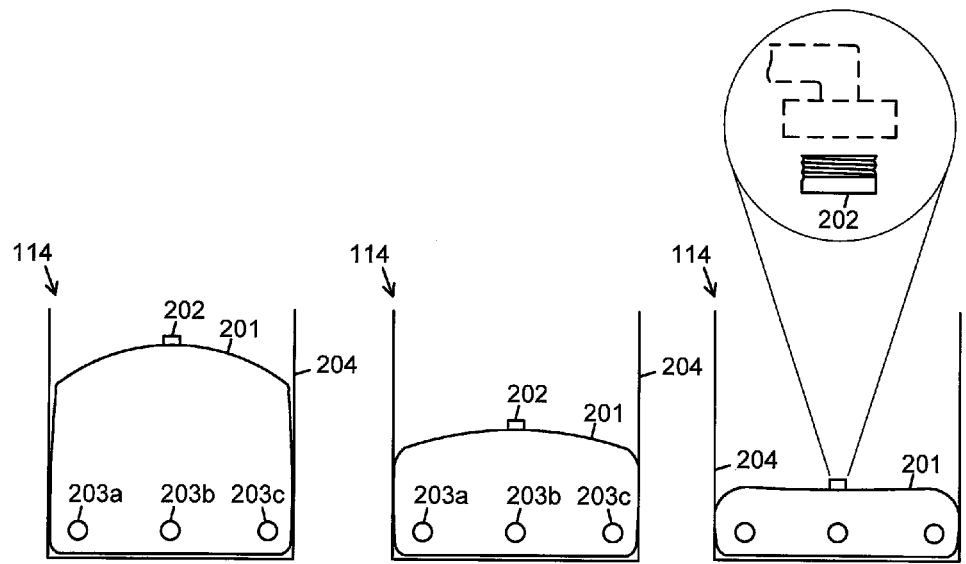
FIGS. 2A, 2B and 2C depict a flexible bladder employed in storing solvent-stabilized concentrated surfactant solutions in accordance with one embodiment of the present invention.

FIGS. 1 through 2C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

FIG. 1 is a simplified diagram of concentrated surfactant solution storage proximate to the geographic location of enhanced oil recovery from a subterranean formation in accordance with various embodiments of the present disclosure. In the system 100 depicted, an injector well 101 extending into a subterranean formation including an oil reservoir is located in proximity to a production well 102. Injector well 101 may be located some distance away from production well 102, on the order of several hundred feet or more. Both wells 101, 102 are drilled into a permeable subterranean formation 103, which may contain an underground oil reservoir and may extend from an overburden layer 104 to an underburden layer 105. While wells 101, 102 are depicted as substantially vertical in FIG. 1, other well configurations, including wells forming various angles with an outer or top surface 106 of the Earth are within the scope of this disclosure. Additionally, within the context of this disclosure, the term "injector well" is defined broadly to include any channel, tunnel or hole, either man-made or naturally occurring, of sufficient size and location with respect to a subterranean oil reservoir to facilitate enhanced oil recovery.

As shown in FIG. 1, the borehole of production well 102 may be supported by a casing having a perforated region 108, and a pump 109 located on the surface may be used to extract oil that flows into borehole 102 through the perforated casing from the subterranean formation 103. The borehole of injection well 101 may likewise have a casing with a perforated region 110 to permit fluids injected into injection well 101 to flow into the portion of the subterranean formation 103 between the two wells. In all instances of interest for purposes of the present disclosure, injector well 101 will be a distance from production well 102 that supports enhanced extraction of oil from an oil reservoir of the subterranean formation 103 using surfactants. The oil reservoir will generally be resident within and may be part of subterranean formation 103, and is typically located generally below and between injector well 101 and production well 102.

In accordance with the present disclosure, to enhance recovery of oil from an oil reservoir of subterranean formation 103, injection of fluids to maintain pressure of the oil reservoir within subterranean formation 103 may be accomplished by injecting fluids that comprise a liquid (or fluid) bank. Liquid banks 111, 112, 113 are typical in the arrangement depicted in FIG. 1, with a liquid bank of connate water 112 ahead of liquid bank 111, and banks 111, 112 are behind oil bank 113 in a direction from injector well 101 to recovery well 102. Water and surfactant may be injected into injector well 101 in a post-recovery oil process as part of liquid bank 111. Thus, as liquid bank 111 is injected into subterranean formation 103, liquid bank 111, bank of connate water 112 and oil bank 113 sweep across subterranean formation 103 from injector well 101 to production well 102, thus forcing oil from oil reservoir into to bore hole of production well 102, from which that oil is then pumped.

Because a post-primary oil recovery process of only water flooding yields just a partial recovery of oil present in the subterranean formation after an initial or primary recovery, surface active agents ("surfactants") in the flood water of a water flooding process may be utilized to reduce interfacial tension between the injected water and the formation petroleum. Introducing surfactants in the flood water may permit greater recovery of residual oil after primary production than post-primary recoveries using water flooding alone. Surfactants are typically manufactured in concentrated surfactant solutions that are mixed with water in the field when being pumped into the bore hole for the injector well 101, diluting the active surfactant content.

When manufacturing concentrated surfactant solutions, it is essential that the solution be processed, shipped, stored, pumped and ultimately used in the designated application all within the life time of the solution—that is, before the useful properties of the solution substantially degrade. Typical degradation issues that arise include instability over time of key active ingredients, generally an anionic sulphated surfactant. If not stabilized, the concentrated surfactant solution and/or an anionic surfactant within the solution either physically or chemically disintegrate into constituent parts or other degradation products. Thus the concentrated surfactant solution must provide sufficient stability over time from the point of making until the point of application, and must provide such stability at all temperatures at which the solution is processed, shipped, stored, pumped and applied.

To stabilize concentrated surfactant solutions that include active surfactant content ranging from 35% to 90%, alcohols such as isopropyl alcohol or isobutyl alcohol are added to stabilize the concentrated solutions. Preventing evaporation of the alcohol added to enhance concentrated surfactant solution stability is thus essential to transporting, storing and preserving the concentrated surfactant solutions in the field. One factor that contributes significantly to evaporation of the alcohol is the headspace, the volume in the storage device that does not contain solution and into which alcohol from the solution may evaporate and, from that volume, leak out from the storage container. A larger headspace allows faster evaporation of the alcohol from the concentrated surfactant solution. Minimizing the volume of free space within the storage container not occupied by the concentrated surfactant solution thus slows evaporation of the alcohol and contributes to maintaining stability of the solution. Normally, however, the head space in a storage tank increases as the contents of that tank are used.

The present disclosure thus employs a storage container 114 to store blended concentrated surfactant solutions proximate to the injection well 101 and remote from the site of manufacture of the concentrated surfactant solution (that is, closer to the injection well than the site of manufacture). The storage container 114 may thus be located at the well head of a single injection well 101, or at a central injection facility that supplies multiple injection wells including injection well 101 (which may all penetrate the same subterranean formation or may penetrate separate subterranean formations). The storage container 114 automatically minimizes headspace as the fluid level within the storage container decreases. The storage container 114 uses a sealed, flexible bladder that can hold anywhere from 500 gallons to over 10,000 gallons to store the concentrated surfactant solution. As the concentrated surfactant solution is drawn from the sealed bladder, the bladder collapses, limiting headspace and thus reducing if not eliminating alcohol evaporation. Notably, the present disclosure is applicable not only to surfactant solutions including alcohols as a stabilizing agent, but also to solutions containing a solvent more volatile than the surfactant, diluent(s) of higher volatility than the surfactant (such as alcohol), or any other high volatility constituent. Thus, the disclosure relates to a method for storing a fluid within a flexible bladder that deflates as a fluid level within the bladder decreases, wherein the fluid comprises a concentrated surfactant solution for use in enhanced oil recovery and including a constituent having a volatility higher than a volatility of a surfactant within the concentrated surfactant solution.

FIGS. 2A, 2B and 2C depict a flexible bladder employed in storing solvent-stabilized concentrated surfactant solutions in accordance with one embodiment of the present invention. Storage container 114 includes a flexible bladder 201 made of polyurethane coated fabric (e.g., nylon) or any other suitable impermeable or semipermeable membrane, with the membrane facing the interior of the bladder 201. When fully filled, the bladder 201 expands to a maximum size as depicted in FIG. 2A. As fluid is drawn from the bladder 201, however, the bladder deflates or collapses to a smaller size as shown in FIGS. 2B and 2C. As the bladder 201 deflates, the headspace inside the bladder (which is preferably close to zero) is automatically maintained or minimized by collapse of the top surface of the bladder with decline in the fluid level.

In an exemplary embodiment, bladder 201 has an estimated capacity of at least about 3,600 gallons (but may be fabricated with a capacity of up to about 200,000 gallons), dimensions when completely deflated (flat) of approximately 12.5 feet×8.8 feet, dimensions when full of approximately 12 feet×8 feet×5 feet, and a tare (empty) weight of about 75 pounds (lbs). Bladder 201 includes fittings including a 2 inch diameter polypropylene top vent and/or agitation port 202 with a male pipe threads (MPT) threaded cap and three 2 inch diameter polypropylene end ports 203a-203c with an MPT threaded cap. Similar bladders are used to store potable drinking water or bulk apple juice and are available from JKS International LLC of Picayune, Miss. (jksflexibletanks.com).

The flexible bladder may be free-standing or may alternatively be held inside a rigid support structure 204, such as a standard 20 foot box container. Use of a standard box container to hold the flexible bladder 201 facilitates transportation of the concentrated solvent solution within the bladder by rail or semi-trailer.

A further advantage of the bladder is the low cost. An alternative method for limiting headspace involves tanks with floating tank tops, but such containers can be 10 to 20 times the cost of a flexible bladder as described above.

The present disclosure discloses a method of storing blended concentrated surfactant solutions for transportation in the field. Using a storage structure that automatically minimizes headspace as fluid level decreases reduces evaporation of alcohol stabilizing the solution, and increases the time that may lapse between manufacture and application.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
storing a fluid within a flexible bladder that deflates as a fluid level within the bladder decreases,
wherein the fluid comprises a concentrated surfactant solution and includes a constituent having a volatility higher than a volatility of a surfactant within the concentrated surfactant solution, and
wherein the flexible bladder comprises a top port and at least one end port, each port having threaded fittings for connection to an external conduit.

2. The method according to claim 1, wherein the deflation of the flexible bladder maintains an amount of head space over the fluid within the flexible bladder as the fluid is dispensed from the flexible bladder, slowing evaporation of the constituent.

3. The method according to claim 2, wherein the amount of head space over the fluid within the flexible bladder is minimal when the flexible bladder is fully filled with the fluid.

4. The method according to claim 1, further comprising:
providing a rigid structure for holding the flexible bladder.

5. The method according to claim 4, wherein the rigid structure comprises a box container.

6. The method according to claim 1, wherein the constituent comprises a diluent.

7. The method according to claim 1, wherein the constituent comprises a solvent.

8. The method according to claim 1, wherein the constituent comprises an alcohol.

9. The method according to claim 1, wherein the flexible bladder comprises polyurethane coated fabric.

10. The method according to claim 1, wherein the flexible bladder is configured to deflate as the fluid level within the bladder decreases,
wherein the flexible bladder is configured to deflate so that an upper surface of the flexible bladder moves downward as the level of the fluid within the bladder decreases, and
wherein the downward movement of the upper surface maintains a head space over the fluid within the flexible bladder to inhibit evaporation of the constituent from the fluid into the head space.

11. An apparatus, comprising:
a flexible bladder configured to store a fluid and to deflate as a fluid level within the bladder decreases so that an upper surface of the flexible bladder moves downward as the flexible bladder deflates,
wherein the fluid comprises a concentrated surfactant solution and includes a constituent having a volatility higher than a volatility of a surfactant within the concentrated surfactant solution, and
wherein the flexible bladder comprises a top port and at least one end port, each port having threaded fittings for connection to an external conduit.

12. The apparatus according to claim 11, wherein the deflation of the flexible bladder maintains an amount of head space over the fluid within the flexible bladder as the fluid is dispensed from the flexible bladder, slowing evaporation of the constituent.

13. The apparatus according to claim 12, wherein the amount of head space over fluid within the flexible bladder is minimal when the flexible bladder is fully filled with the fluid.

14. The apparatus according to claim 11, further comprising:
a rigid structure configured to hold the flexible bladder.

15. The apparatus according to claim 14, wherein the rigid structure comprises a box container.

16. The apparatus according to claim 11, wherein the constituent comprises a diluent.

17. The apparatus according to claim 11, wherein the constituent comprises a solvent.

18. The apparatus according to claim 11, wherein the constituent comprises an alcohol.

19. The apparatus according to claim 11, wherein the flexible bladder comprises polyurethane coated fabric.

20. An apparatus, comprising:
a flexible bladder storing a fluid, wherein the fluid comprises a concentrated surfactant solution and includes a constituent having a volatility higher than a volatility of a surfactant within the concentrated surfactant solution,
wherein the flexible bladder is configured to deflate as a level of the fluid within the bladder decreases,
wherein the flexible bladder is configured to deflate so that an upper surface of the flexible bladder moves downward as the level of the fluid within the bladder decreases, and
wherein the downward movement of the upper surface maintains a head space over the fluid within the flexible bladder to inhibit evaporation of the constituent from the fluid into the head space.

* * * * *